No. 609,446. Patented Aug. 23, 1898.
P. LWOFF.
VEHICLE SPRING.
(Application filed Mar. 1, 1898.)
(No Model.)
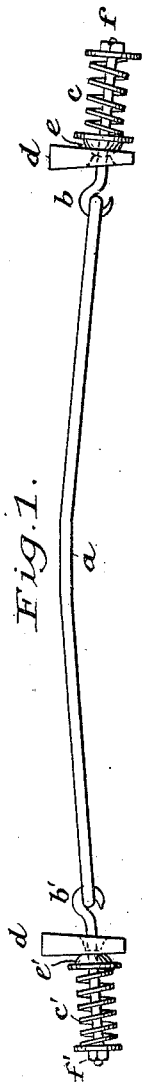
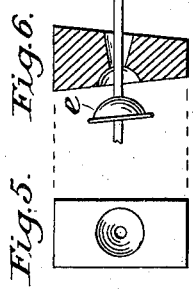
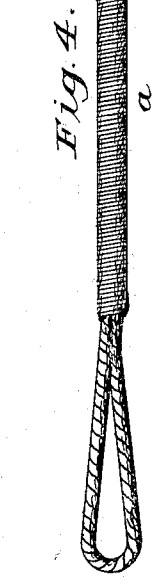
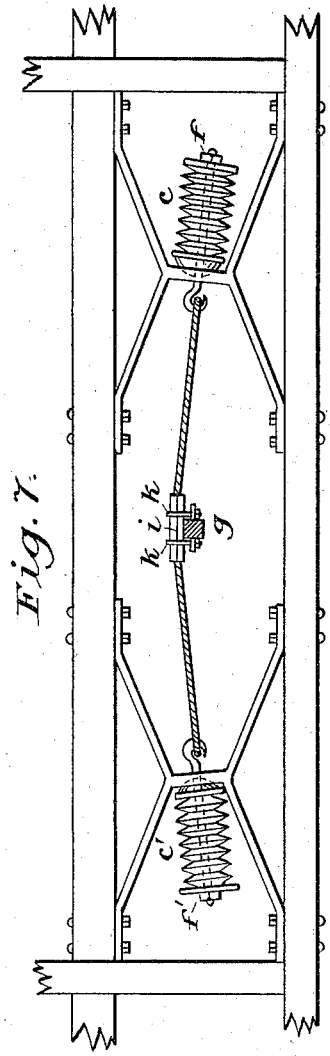
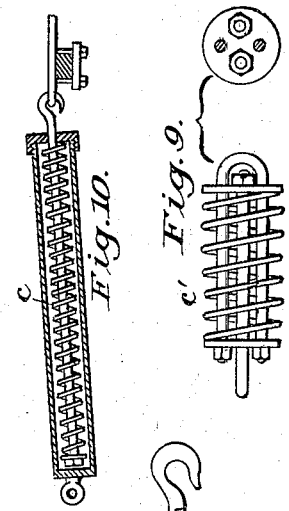
WITNESSES:
E. B. Bolton
INVENTOR
Prince Paul Lwoff
BY Richards
ATTORNEYS

United States Patent Office.

PAUL LWOFF, OF ST. PETERSBURG, RUSSIA.

VEHICLE-SPRING.

SPECIFICATION forming part of Letters Patent No. 609,446, dated August 23, 1898.

Application filed March 1, 1898. Serial No. 672,213. (No model.)

*To all whom it may concern:*

Be it known that I, PAUL LWOFF, a subject of the Emperor of Russia, and a resident of St. Petersburg, Russia, have invented certain new and useful Improvements in Springs for Carriages or Vehicles of All Kinds, of which the following is a specification.

My invention has for its object a special system of springs for carriages, cars, and vehicles of all kinds.

The spring of my system, which I call the "cable-spring system," consists, essentially, of a cable or a rope attached by its ends to the fixed parts of the body or frame of the vehicle with the aid of springs of buffer type, the middle part of the cable or rope bearing on the axle of the vehicle.

The annexed drawings represent, in Figure 1, a side view of the general arrangement of the spring of my system. Figs. 2 to 6 are detailed views of separate parts of my system. Fig. 7 represents the lower part of a carriage-frame with my spring attached thereto. Figs. 8, 9, and 10 represent modified forms of buffer-springs.

As shown on the drawings, my spring consists of a cable $a$, (preferably made of steel wire,) provided with eyes or lugs $y$ on its ends, by which the cable is attached to the hooked ends of the bolts $b\ b'$, fixed to the carriage-frame $d$ by means of the buffer-springs $c\ c'$.

It is obvious that the constructive arrangements of the springs of my system may be greatly varied. The annexed drawings represent some practical forms of constructive details without limiting myself to these arrangements. So, for instance, when employing a cable with eyes on its ends, Fig. 2, I insert in the eyes $y$ metallic rings $x$, Fig. 3, in order to prevent the abrading of the cable. The hooked ends of the bolts $b\ b'$ traversing the fixed parts of the carriage-frame pass through washers or cup-formed end pieces $e\ e'$ of the buffer-springs $c\ c'$, which may consist of spiral springs, Fig. 1, or caoutchouc buffers or cup-formed springs, Fig. 7, &c. To allow a free motion of the bolts $b\ b'$ in all directions, the washers $e$ are made of spherical form and are located in spherical cavities of the fixed parts of the carriage-frame, Figs. 5 and 6. On the inner sides of these fixed parts the cavities have preferably a conical form, Figs. 5 and 6. The end of each bolt $b\ b'$ projecting from the end washer $e'$ of the buffer-spring is retained by a nut $f$ or the like.

Buffer-springs can be arranged externally to the fixed parts of the carriage, as shown on Figs. 1 and 7, or inwardly—that is to say, between the axle and said fixed parts. By making buffer-springs sufficiently long and by placing them between the axle and the fixed parts of the carriage I can in some instances even omit the cable, as indicated on Fig. 10.

Figs. 8 and 9 represent two forms of buffer-springs suited to my system. In Fig. 8 the spring is inclosed in a sheath, and in Fig. 9 the spring is open and is acted upon by two forked links. In all cases the corresponding parts (sheath or forked link) are attached to the carriage-frame, preferably by means of hooks.

The cable $a$ can be made in form of a continuous loop, the middle part of which is wrapped around by a cord or wire or inclosed in a tube, &c., as shown on Fig. 4. The mode of fixing the middle part of the cable to the carriage-axle can be also of any suitable kind.

As shown in Fig. 7, the cable $a$ can be attached to the axle $g$ by means of a box $i$ and hoops $k$.

Each of the carriage-axles is provided, preferably, with two cable-springs of my system; but their number can, if desired, be increased, and on the other hand I can use, for instance, only two springs in a four-wheeled carriage by attaching each of the cable-springs to both axles of the carriage.

Springs of my system are applicable to carriages or vehicles of any kind, the railway-cars not excepted. For this latter purpose it is advisable to attach the ends of the cable to buffer-springs by means of levers in order to avoid the use of buffers of too big dimensions, or in lieu of this I prefer to attach buffer-springs directly to the axle-box of the railway-car.

The chief advantages of my cable-springs are that all parts of the spring are subjected to tensions and compressions and not to flexion. Besides this the springs of my system have the same flexibility and elasticity not only in the vertical but also in all side directions.

I claim as my invention—

In combination, the axle, the frame, the cable having its central portion resting upon the axle, and a pair of buffer-springs carried by said frame and connected to opposite ends of the cable, substantially as described.

In witness whereof I have hereunto set my hand in presence of two witnesses.

PAUL LWOFF.

Witnesses:
N. TSCHENALEFFE,
J. N. LON.